Feb. 4, 1930. F. G. BELOTE 1,745,829
AUTOMOBILE UNLOADING DEVICE
Filed April 16, 1929 2 Sheets-Sheet 1
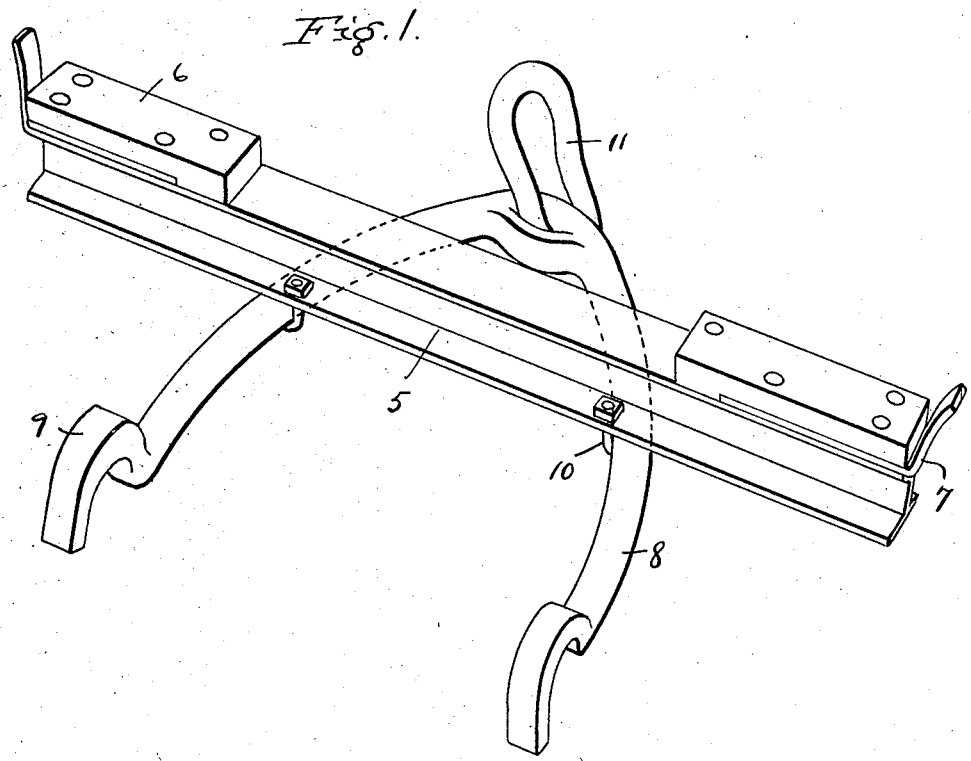
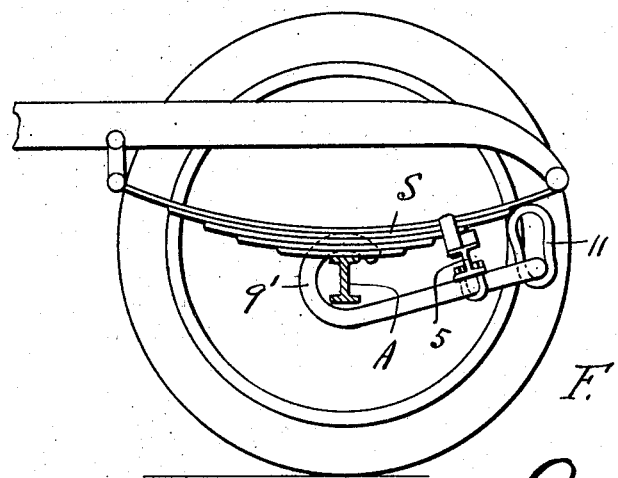
Inventor
F. G. Belote
By Clarence A. O'Brien
Attorney Feb. 4, 1930. F. G. BELOTE 1,745,829
AUTOMOBILE UNLOADING DEVICE
Filed April 16, 1929 2 Sheets-Sheet 2
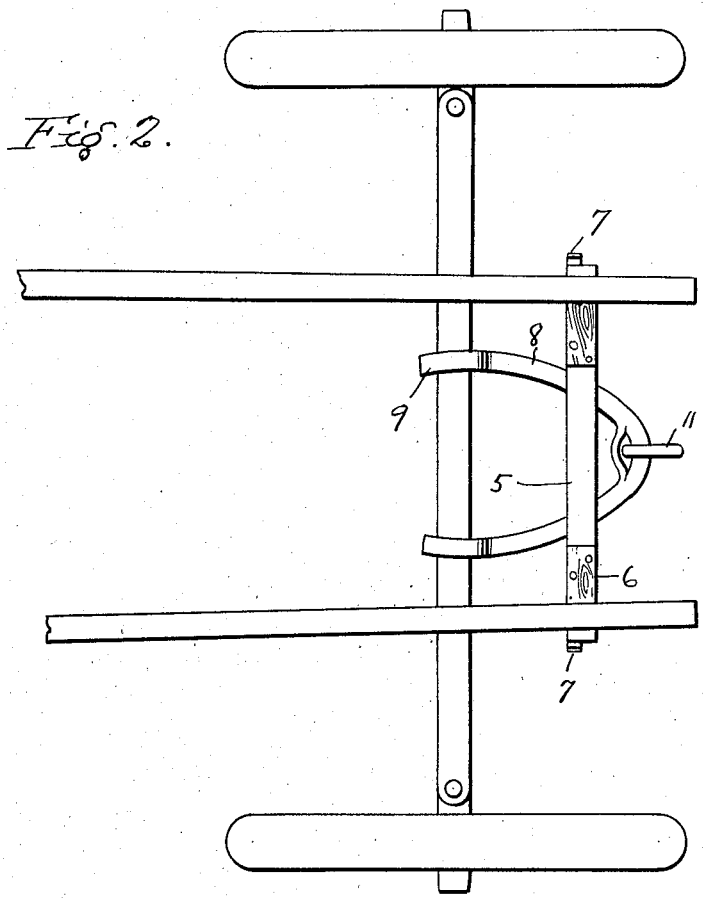
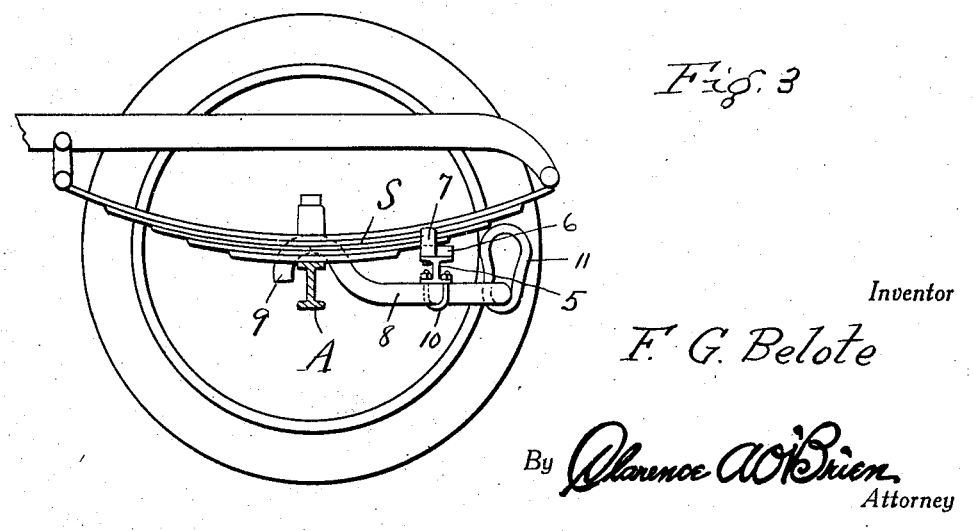
Inventor
F. G. Belote
By Clarence A. O'Brien
Attorney Patented Feb. 4, 1930

1,745,829

UNITED STATES PATENT OFFICE

FARRALD GOFF BELOTE, OF WACO, TEXAS

AUTOMOBILE UNLOADING DEVICE

Application filed April 16, 1929. Serial No. 355,640.

The present invention relates to an automobile unloading device and has for its prime object to provide means for unloading automobiles of any kind, from box cars and the like, enabling the mechanic to hoist the car high enough to clear the block with safety, and to permit the cars being lowered to the floor with safety, ease and economy.

Another very important object of the invention resides in the provision of an unloading or hoisting device of this nature which is very easy to apply to the car and consists of but a few strong parts.

Another very important object of the invention resides in the provision of a device of this nature which is exceedingly simple in its construction, inexpensive to manufacture, thoroughly efficient and reliable in use, and otherwise well adapted to the purpose for which it is designed.

With the above and numerous other objects in view, as will appear as the description proceeds, the invention resides in certain novel features of construction and in the combination and arrangement of parts as will be hereinafter more fully described and claimed.

In the drawings:

Figure 1 is a perspective view of the device embodying the features of my invention.

Figure 2 is a top plan view thereof showing the same applied.

Figure 3 is a side elevation thereof showing the same applied, and

Figure 4 is a similar view of another embodiment of the invention.

Referring to the drawing in detail, it will be seen that the numeral 5 denotes an I beam, at the ends of upper surface of which are blocks 6, which hold in place strap iron hooks 7. There blocks and hooks 7 may be adjusted to accommodate the difference between the springs of different makes of automobiles. A substantially V-shaped bar 8 is provided with upwardly extending down-turned hooks 9 or with upwardly curved hook extremities 9'. U-bolts 10 secure the bar 8 to the angle I beam 5. A clevis 11 is engaged with the center or apex of the bar 8.

The hooked ends 9 or 9' are engaged over the axle A while the springs S rest on the blocks 6 and the snap hooks 7 prevent side slipping and the clevis 11, of course, is engaged with the hook of the hoisting apparatus of conventional construction (not shown).

From the above detailed description it will be seen that I have devised a device of this nature which is exceedingly easy to apply, is simple in construction, may be made strong and durable, and may be manufactured at a comparatively low cost.

It is thought that the construction, utility and advantages of this invention will now be quite apparent to those skilled in this art, without a more detailed description thereof.

The present embodiment of the invention has been disclosed in considerable detail merely for the purposes of exemplification, since in actual practice it attains the features of advantage enumerated as desirable in the statement of the invention and the above description.

It will be apparent that changes in the details of construction and in the combination and arrangement of parts may be resorted to, without departing from the spirit or scope of the invention as hereinafter claimed or sacrificing any of its advantages.

Having thus described my invention, what I claim as new is:

1. A device of the class described comprising a beam, a V-shaped member having intermediate portions of its arms fixed to the beam and terminating in hooks, a clevis fixed to the apex portion of the member.

2. A device of the class described comprising a beam, a V-shaped member having intermediate portions of its arms fixed to the beam and terminating in hooks, a clevis fixed to the apex portion of the member, blocks fixed to the extremities of the beam adapted to engage the springs of an automobile to be hoisted.

3. A device of the class described comprising a beam, a V-shaped member having intermediate portions of its arms fixed to the beam and terminating in hooks, a clevis fixed to the apex portion of the bar member, blocks fixed to the extremities of the beam adapted to engage the springs of an automobile to be hoisted, and stop hooks fixed to the beam under the block to prevent the springs from slipping off of the block.

In testimony whereof I affix my signature.

FARRALD GOFF BELOTE.